(12) United States Patent
Serrentino et al.

(10) Patent No.: US 11,263,430 B2
(45) Date of Patent: Mar. 1, 2022

(54) METHOD OF COLLECTING BIOLOGICAL MATERIAL AND A TERMINAL FOR PERFORMING THE METHOD

(71) Applicant: IDEMIA IDENTITY & SECURITY FRANCE, Courbevoie (FR)

(72) Inventors: Maria-Elisabetta Serrentino, Courbevoie (FR); Pierre Chastel, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 0 days.

(21) Appl. No.: 17/100,143

(22) Filed: Nov. 20, 2020

(65) Prior Publication Data

US 2021/0158011 A1    May 27, 2021

(30) Foreign Application Priority Data

Nov. 22, 2019    (FR) ...................... 19 13102

(51) Int. Cl.
*G06K 9/00* (2006.01)
(52) U.S. Cl.
CPC ....... *G06K 9/00067* (2013.01); *G06K 9/0004* (2013.01); *G06K 9/00087* (2013.01)
(58) Field of Classification Search
CPC ............. G06K 9/00067; G06K 9/0004; G06K 9/00087; G06K 9/00033; G06K 9/00073; G06K 9/00093; G06K 9/00885; G06K 9/6215; G06K 2009/00946
See application file for complete search history.

(56) References Cited

U.S. PATENT DOCUMENTS

| | | | |
|---|---|---|---|
| 2003/0197853 A1 | 10/2003 | Fenrich | |
| 2012/0148115 A1* | 6/2012 | Birdwell | G06K 5/00 382/116 |
| 2013/0287270 A1 | 10/2013 | Harper | |
| 2015/0225783 A1* | 8/2015 | Mears | A61B 10/02 435/6.11 |

* cited by examiner

*Primary Examiner* — Edward F Urban
*Assistant Examiner* — Wassim Mahrouka
(74) *Attorney, Agent, or Firm* — Muncy, Geissler, Olds & Lowe, P.C.

(57) ABSTRACT

A method of collecting biological material with the help of a mobile terminal, the method including the following steps: acquiring a first image and extracting a first candidate biometric dataset therefrom; comparing the candidate biometric dataset with reference biometric datasets and determining similarity scores; comparing the similarity scores with a first predetermined threshold; and when none of the similarity scores is greater than the first predetermined threshold, proceeding to collect biological material from the first dermatoglyph.

10 Claims, 5 Drawing Sheets

METHOD OF COLLECTING BIOLOGICAL MATERIAL AND A TERMINAL FOR PERFORMING THE METHOD

FIELD OF THE INVENTION

The invention relates to the field of collecting biological samples, in particular in the context of police investigations. The invention thus relates to the topic known as "forensic science".

BACKGROUND OF THE INVENTION

Typically, when investigating the scene of a crime or an offence (referred to below as a crime scene), fingerprints or palmprints (also known as dermatoglyphs) are taken, together with samples of biological material, in order to identify the persons who were present at the crime scene at the time of the crime or the offence and, more specifically, in order to identify any presence at the scene that is unusual and that might be suspicious.

Computer means and databases currently available to law-enforcement enable dermatoglyphs to be used quickly and inexpensively.

However, this is not true for samples of biological material, which need to be sent to a laboratory that then establishes a DNA profile of the person who left the biological material that has been taken and compares it with DNA profiles stored in databases or obtained from samples taken directly from identified persons. Such DNA analysis is expensive and takes a relatively long time (eight hours when urgent, to as long as several days).

Also, when the crime scene is a place normally occupied by a first defined set of individuals (e.g. the inhabitants of an apartment block in the event of a burglary), it often happens that most of the samples of biological material that are taken from the crime scene belong to the individuals of the first set for whom it is already known they were or have been present at the crime scene. This results in useless expense.

Also, these "useless" samples of biological material lead to a considerable loss of time for the experts taking them on site, and they can represent a large proportion of the analyses carried out for a given enquiry, thereby increasing the cost of each "useful" sample.

OBJECT OF THE INVENTION

An object of the invention is to reduce the cost and the time that needs to be devoted to the biological material samples that are taken during police investigations.

SUMMARY OF THE INVENTION

To this end, there is provided a method of collecting biological material with the help of a mobile terminal, said mobile terminal comprising an electronic processor unit connected to an image capture device and to an alerting member in order to control them. The capture device has optical characteristics adapted to acquiring images of dermatoglyphs. The method comprises the following steps:
acquiring a first image of a first dermatoglyph and extracting a first candidate biometric dataset therefrom;
comparing the candidate biometric dataset with reference biometric datasets and determining a similarity score between the candidate biometric dataset and each of the reference biometric datasets;
comparing the similarity scores with a predetermined threshold; and
when none of the similarity scores is greater than the predetermined threshold, issuing a first alert; and
when the first alert is issued, proceeding to collect biological material in a zone neighboring the first dermatoglyph.

This provides a method that makes it possible, quickly and in real time, to discriminate between samples that might turn out to be "useful" and samples that are certain to be "useless". Specifically, when the reference biometric datasets correspond to biometric data of known individuals whose presence at the scene of investigation is normal, the method makes it possible to discriminate between "useful" samples and "useless" samples. This serves to reduce the number of samples taken and the number of analyses performed for a given crime scene by taking only samples that might be useful, thereby lowering the overall cost price of taking samples and of performing analyses for a given crime scene.

Collection operations can be performed more quickly and they present better traceability when, once the first alert has been issued, the method includes an additional step of preparing a first identifier and of storing the first identifier in association with the first image. When the first identifier comprises a barcode, it can be read quickly.

It is possible to reduce operations of taking samples of biological material when the method includes an additional step of issuing a second alert once there exists a similarity score that is greater than a second predetermined threshold. This makes it possible to interrupt calculating similarity scores when one such score confirms that the first dermatoglyph does indeed belong to an individual whose presence on site is normal.

The operation can be performed quickly when the method includes a preliminary step of using the capture device to acquire the reference biometric datasets. Alternatively, the reference biometric datasets are stored, at least in part, on a remote server, and the mobile terminal includes communication means for communicating with the remote server.

The privacy and confidentiality of the biometric data is preserved when the method includes a step of deleting the reference biometric datasets at the end of operations for collecting biological material.

The invention also provides a mobile terminal comprising an electronic processor unit connected to an image capture device and to an alerting member in order to control them, the image capture device having optical characteristics adapted to acquiring images of dermatoglyphs, and wherein the processor unit is programmed to perform the method of the invention.

Advantageously, the alerting member produces an audible and/or a visible warning and/or comprises a buzzer.

Also advantageously, the acquisition device comprises an optical sensor.

Other characteristics and advantages of the invention appear on reading the following description of particular, nonlimiting implementations of the invention.

DETAILED DESCRIPTION OF THE INVENTION

Figure 1:
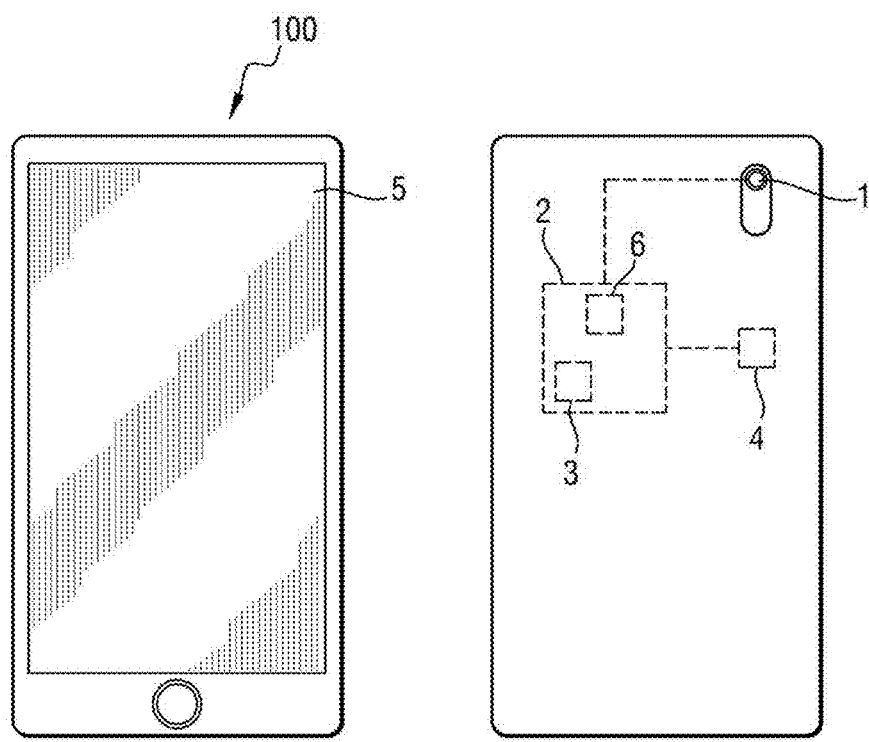
FIG. 1 is a diagram of a terminal in a first implementation of the invention.
Figure 2:
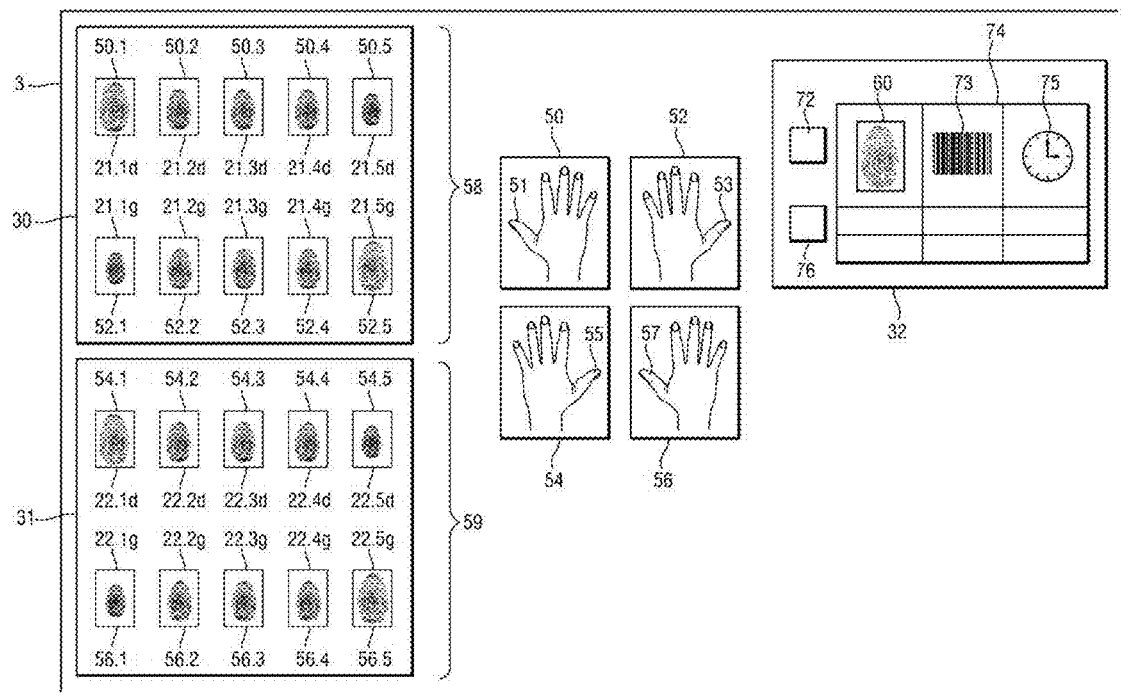
FIG. 2 is a diagram of a memory of the FIG. 1 terminal.

With reference to FIGS. 1 and 2, the mobile terminal of invention, given overall reference 10, is a mobile telephone of the smartphone type. The terminal 10 includes an optical sensor 1 of the charge-coupled device (CCD) type that is connected to a microprocessor 2 connected to a memory 3. The terminal 10 also includes a buzzer 4 and a touchscreen 5 that are connected to the microprocessor 2. The memory 3 includes an operating system program for the terminal 10 and also a biometric recognition program, both of which can be executed by the microprocessor 2. The biometric recognition program includes instructions arranged to extract biometric characteristics (commonly referred to as "minutiae") from images of dermatoglyphs and to calculate a similarity score by comparing the biometric characteristics with one another. For this purpose, the biometric recognition program performs a conventional, so-called "matching", algorithm 6.

The memory 3 includes a first memory location 30, a second memory location 31, and a third memory location 32.

Figure 3:
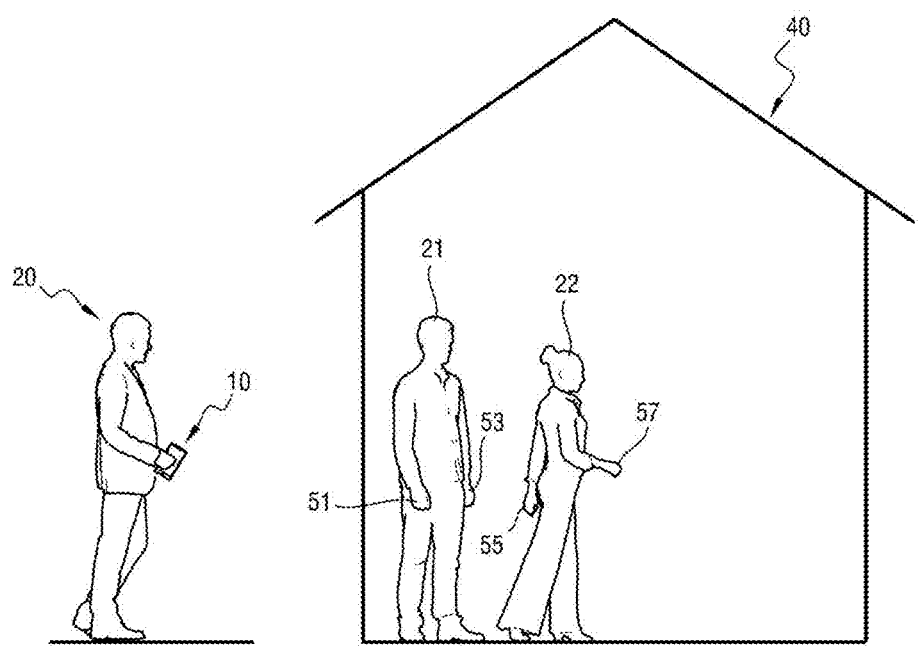
FIG. 3 is a diagram of a crime scene giving rise to an investigation in accordance with the invention.

The use of the terminal 10 is described below with reference to investigations being carried out by a technician 20 on an investigation scene 40, specifically a house normally occupied by a first individual 21 and a second individual 22 (FIG. 3).

During a preliminary first step, the technician 20 makes a first acquisition of a first preliminary image 50 of the right hand 51 of the first individual 21, a second acquisition of a second preliminary image 52 of the left hand 53 of the first individual 21, a third acquisition of a third preliminary image 54 of the right hand 55 of the second individual 22, and a fourth acquisition of a fourth preliminary image 56 of the left hand 57 of the second individual 22.

The first, second, third, and fourth acquisitions are performed using the optical sensor 1 of the terminal 10, e.g. by photographing the fingers of the right and left hands 51 and 53 of the first individual 21 and of the right and left hands 55 and 57 of the second individual 22. This is described by way of example. In practice, acquisition preferably involves entire hands, i.e. including the palms, and possibly also the bottom surfaces of feet.

From the first preliminary image 50 of the right hand 51 of the first individual 21, the microprocessor 2 extracts a first set of minutiae 50.1 of the right thumb 21.1$d$, a second set of minutiae 50.2 of the right index finger 21.2$d$, a third set of minutiae 50.3 of the right middle finger 21.3$d$, a fourth set of minutiae 50.4 of the right ring finger 21.4$d$, and a fifth set of minutiae 50.5 of the right little finger 21.5$d$.

From the second preliminary image 52 of the left hand 53 of the first individual 21, the microprocessor 2 extracts a sixth set of minutiae 52.1 of the left thumb 21.1$g$, a seventh set of minutiae 52.2 of the left index finger 21.2$g$, an eighth set of minutiae 52.3 of the left middle finger 21.3$g$, a ninth set of minutiae 52.4 of the left ring finger 21.4$g$, and a tenth set of minutiae, 52.5 of the little finger 21.5$g$ of the left hand 53.

In corresponding manner, the microprocessor 2 extracts from the third preliminary image 54 of the right hand 55 of the second individual 22, an eleventh set of minutiae 54.1 of the right thumb 22.1$d$, a twelfth set of minutiae 54.2 of the right index finger 22.2$d$, a thirteenth set of minutiae 54.3 of the right middle finger 22.3$d$, a fourteenth set of minutiae 54.4 of the right ring finger 22.4$d$, and a fifteenth set of minutiae 54.5 of the right little finger 22.5$d$ of the right hand 55.

From the fourth preliminary image 56 of the left hand 57 of the second individual 22, the microprocessor 2 extracts a sixteenth set of minutiae 56.1 from the left thumb 22.1$g$, a seventeenth set of minutiae 56.2 from the left index finger 22.2$g$, an eighteenth set of minutiae 56.3 from the left middle finger 22.3$g$, a nineteenth set of minutiae 56.4 from the left ring finger 22.4$g$, a twentieth set of minutiae 56.5 from the left little finger 22.5$g$.

The sets of minutiae 50.1, 50.2, 50.3, 50.4, 50.5, 52.1, 52.2, 52.3, 52.4, 52.5 constitute a first dataset 58 of reference biometric data that is stored in the first memory location 30 of the memory 3.

The sets of minutiae 54.1, 54.2, 54.3, 54.4, 54.5, 57.1, 57.2, 57.3, 57.4, 57.5 constitute a second dataset 59 of reference biometric data that is stored in the second memory location 31 of the memory 3.

Figure 4:
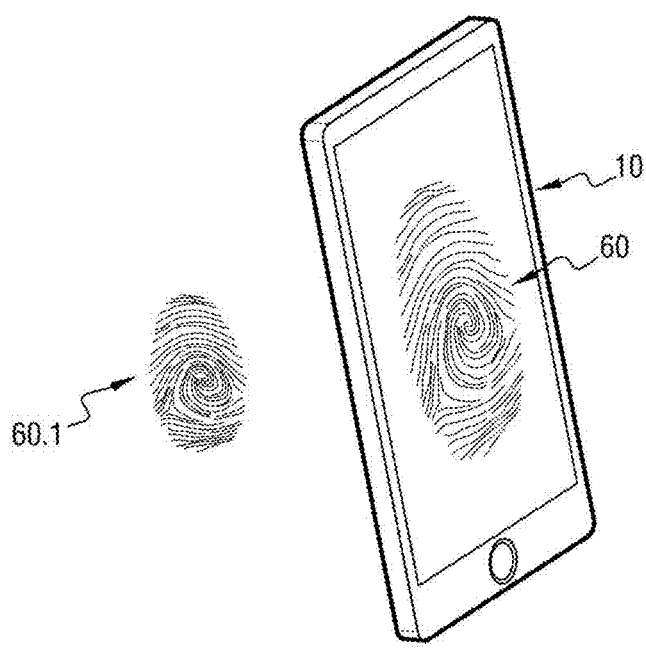
FIG. 4 is a diagram of a second step in the method of the invention.

During a second step, and with reference to FIG. 4, the technician 20 uses the touchscreen 5 to trigger the optical sensor 1 to capture a first image 60 of a first dermatoglyph 60.1 present on the scene 40. During capture, and if necessary, the technician may make use of known techniques (lighting, filtering, . . . ) to make the dermatoglyph stand out from the medium on which the dermatoglyph is applied.

Figure 5:
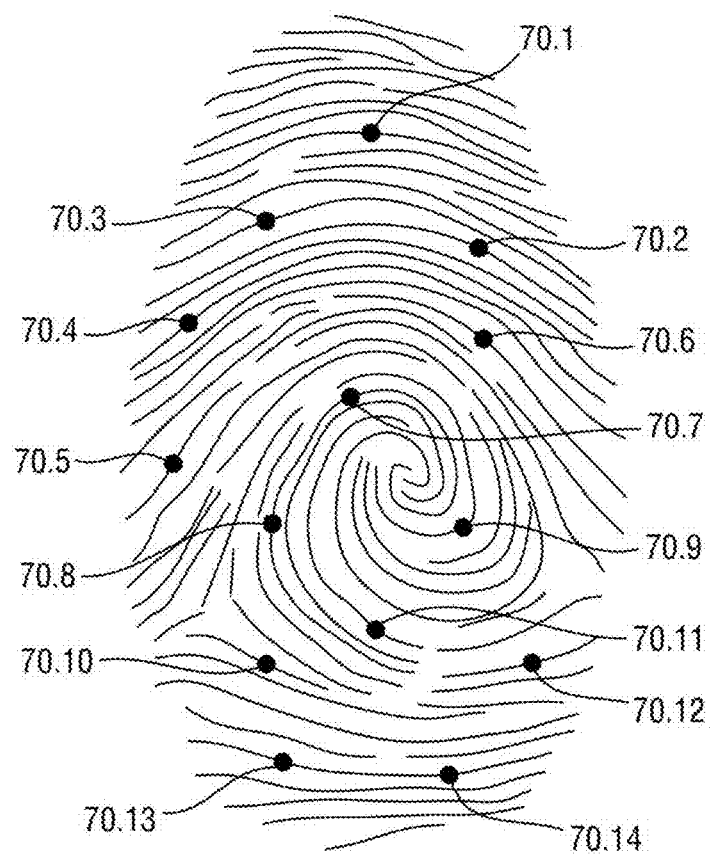
FIG. 5 is a diagram of a fingerprint.

In this example, the microprocessor 2 extracts from the first image 60 a first candidate biometric dataset 70, comprising fourteen candidate sets of minutiae 70.1 to 70.14 (FIG. 5). The first candidate biometric dataset 70 is stored in the second memory location 31 of the memory 3.

In a second step, the algorithm 6 establishes a first similarity score 61.1 between the first set 70 of candidate minutiae and the first set of minutiae 50.1. In corresponding manner, the microprocessor 2 establishes a second similarity score 61.2 between the first set of candidate minutiae 70 and the second set of minutiae 50.2, a third similarity score 61.3 between the first set of candidate minutiae 70 and the third set of minutiae 50.3, a fourth similarity score 61.4 between the first set of candidate minutiae 70 and the fourth set of minutiae 50.4, a fifth similarity score 61.5 between the first set of candidate minutiae 70 and the fifth set of minutiae 50.5, a sixth similarity score 61.6 between the first set of candidate minutiae 70 and the sixth set of minutiae 52.1, a seventh similarity score 61.7 between the first set of candidate minutiae 70 and the seventh set of minutiae 52.2, an eighth similarity score 61.8 between the first set of candidate minutiae 70 and the eighth set of minutiae 52.3, a ninth similarity score 61.9 between the first set of candidate minutiae 70 and the ninth set of minutiae 52.4, and a tenth similarity score 61.10 between the first set of candidate minutiae 70 and the tenth set of minutiae 52.5. Similarly, the microprocessor 2 establishes a similarity score 61.11, 61.12, 61.13, 61.14, 61.15, 61.1 61.16, 61.17, 61.18, 61.19, 61.20 between the first set of candidate minutiae 70 and each of the sets of minutiae 54.1, 54.2, 54.3, 54.4, 54.5, 56.1, 56.2, 56.3, 56.4, 56.5. The set of similarity scores 61.1 to 61.20 is stored in the second memory location 31.

Figure 6:
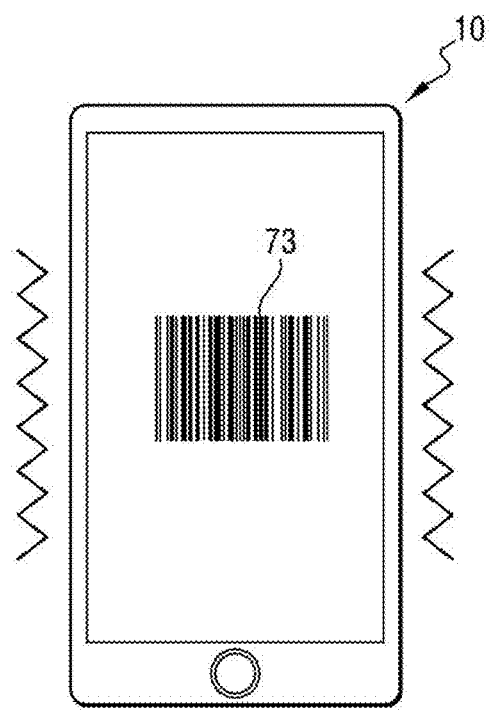
FIG. 6 is a diagram of the terminal in a third step of the method of the invention.

In a third step, the microprocessor 2 compares the set of similarity scores 61.1 to 61.20 with a first predetermined threshold 72 previously entered in the mobile terminal 10 and stored in the third memory location 33. In a fourth step, in the event that the microprocessor 2 finds that none of the similarity scores 61.1 to 61.20 is greater than the first predetermined threshold 72, the microprocessor 2 controls the buzzer 4 so that it issues an alert, e.g. in the form of the terminal 10 vibrating to inform the technician 20 that it is necessary to take a sample of biological material (FIG. 6), while on the contrary, if any of the similarity scores is found to be greater than the first threshold, the microprocessor 2 causes a message to be displayed asking the technician 20 to capture a new image. In a fifth step, in the event that a first alert has been issued, the microprocessor 2 delivers a first identifier 73, in this example in the form of a barcode, that it stores in association with the first image 60 in a table 74 in the third memory location 32. The table 74 is stored in the third memory location 33 and may include a field 75 comprising a geolocation for the first image 60 together with a timestamp for when it was taken.

Each time a first alert is issued, the technician 20 proceeds to take a sample of biological material directly from the dermatoglyph and/or from its immediate surroundings. Once the sample has been taken, the technician 20 specifies the nature of the biological material sample (hair, liquid, greasy deposit, . . . ) in the table 74, and the microprocessor 2 displays a message asking the technician 20 to capture a new image.

If the terminal is connected to a portable printer, it is possible to envisage the terminal 10 printing the identifier 73 on a sticky label for sticking onto the container containing the sample of biological material.

At the end of the operations for collecting biological material, the technician 20 closes the collection session on the terminal 10. The microprocessor 2 then causes the first and second datasets 58 and 59 of reference biometric data to be deleted.

There are thus provided a terminal 10 and a method that make it possible, quickly and in real time, to distinguish between samples that might turn out to be "useful" and samples that are certain to be "useless" since they correspond to the usual occupiers of the scene 40.

In the following description of two other implementations of the invention, elements that are identical or analogous to those described above are given the same numerical references.

In a second implementation, the step of comparing the similarity scores 61.1 to 61.20 with the predetermined threshold is performed by the microprocessor 2 immediately after establishing each of the similarity scores 61.1 to 61.20. In an additional step, the microprocessor 2 causes a second alert to be issued as soon as there exists a similarity score 61.1 to 61.20 that is greater than a second predetermined threshold 76 and greater than the first threshold 72, thereby indicating that the first dermatoglyph 60.1 belongs to the first or second individual. Such an implementation serves to improve the speed of discrimination between a "useful" sample and a "useless" sample by acting as soon as certainty has been established to indicate that the first dermatoglyph 60.1 will lead to a sample that is useless since it belongs to the first individual or to the second individual. This implementation serves to avoid continuing the process of calculating similarity scores once correspondence has been established between the dermatoglyph 60.1 and the first or second individual, thereby shortening processing time.

Figure 7:
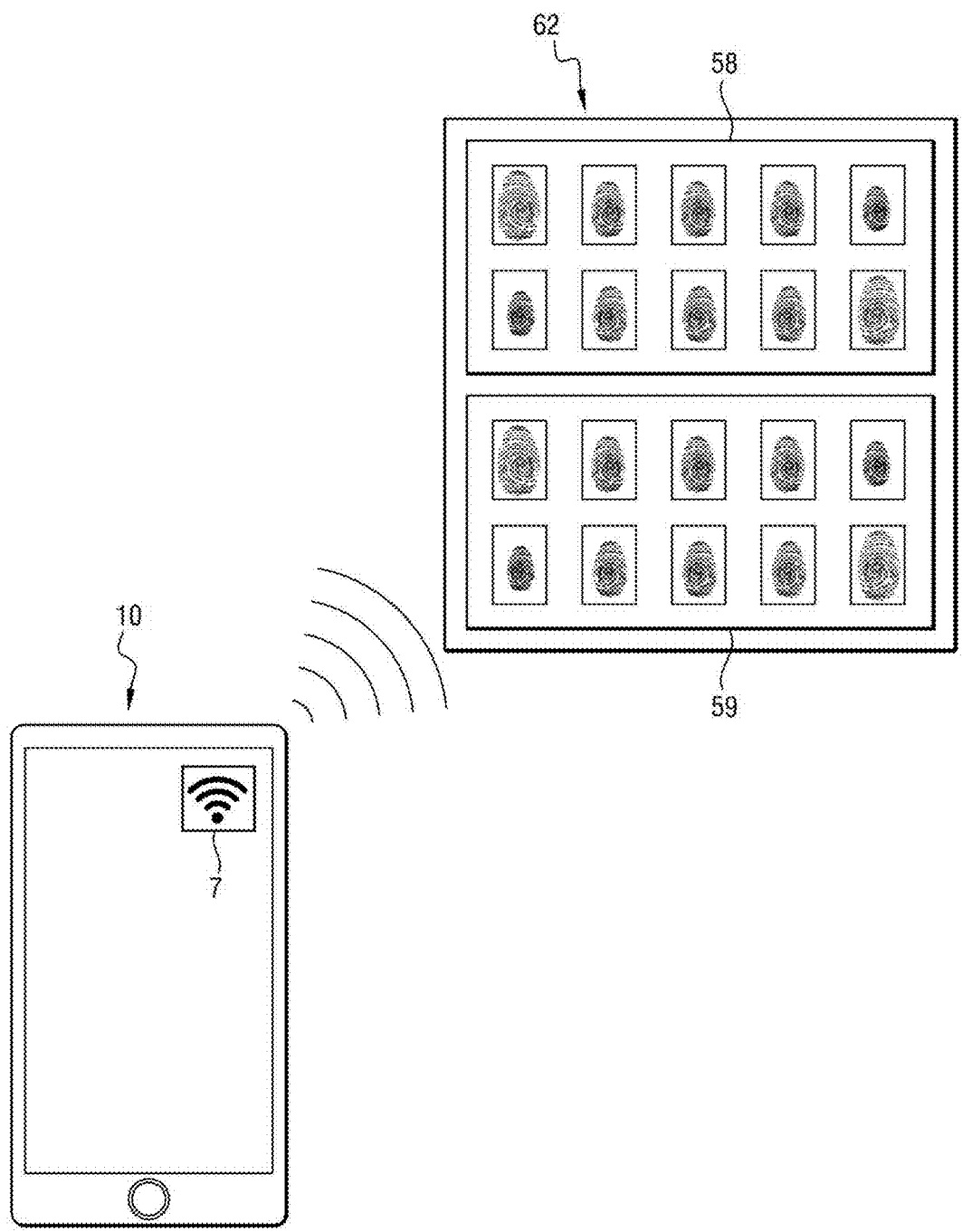
FIG. 7 is a diagram of a third implementation of the invention.

In a third implementation as shown in FIG. 7, the first and second reference biometric datasets 58 and 59 are extracted during a prior operation (e.g. while preparing identity documents) and they are stored on a remote server 62. The mobile terminal 10 includes a GSM cell phone module 7, which acts while terminal 10 is in use to connect, in known manner, with the remote server 62, e.g. via the Internet, and preferably while making use of a secure communication channel of the virtual private network (VPN) type. Once the terminal 10 is linked to the remote server 62, the terminal 10 downloads the first and second reference biometric datasets 58 and 59 from the server and proceeds to establish the similarity scores 61.1 to 61.20. At the end of the operations for collecting biological material, the technician 20 closes the collection session on the terminal 10. The microprocessor 2 then causes the first and second datasets 58 and 59 of reference biometric data to be deleted.

In another version of the third implementation, the terminal 10 consults the first and second reference biometric datasets 58 and 59 in order to proceed with establishing the similarity scores 61.1 to 61.20 without the terminal downloading the first and second datasets 58 and 59.

In this version, when the technician 20 closes the collection session on the terminal 10, the microprocessor 2 then causes a secure message to be sent to the remote server 62 so that it proceeds to delete the first and second reference biometric datasets 58 and 59.

Naturally, the invention is not limited to the above description, but covers any variant coming within the ambit of the invention as defined by the claims.

In particular;
although above the terminal is a smartphone type of mobile telephone, the invention applies equally to terminals of other types, such as for example a laptop computer, a tablet, a device for scanning an investigation scene, or a dedicated terminal;
although above the terminal includes a CCD-type optical sensor, the invention applies equally to image capture devices of other types suitable for acquiring a dermatoglyph, e.g. such as a complementary metal oxide semiconductor (CMOS) sensor, an electric field sensor, or an ultrasound sensor;
although above the terminal includes a microprocessor, the invention applies equally to electronic processor units of other types, e.g. such as a processor, a microcontroller, a field programmable gate array (FPGA), or a wired logic circuit;
although above the terminal includes a buzzer, the invention applies equally to alerting devices of other types, e.g. that produce an audible or a visible warning, and it is possible for different types of alerting device to be combined;
although above the terminal includes an algorithm for matching minutiae, the invention applies equally to other means for comparing the first image with first elements of a first dataset, e.g. such as an image correlation algorithm or a ridge analysis algorithm;
although above the microprocessor extracts fourteen candidate minutiae from the first dermatoglyph, the invention applies equally to extracting some other number of candidate minutiae, e.g. more than fourteen or fewer than fourteen;
although above the first identifier is a barcode, the invention applies equally to first identifiers of other types, e.g. such as an alphanumeric reference or a sample number;
although above the first identifier is stored in association with the first image and with a timestamp, the invention applies equally to storing the first identifier together with information of other types, e.g. such as the reference of a file, the name of the technician taking samples, a reference of the terminal 10, a geolocation, or a calibration certificate for the terminal;

although above the first and second reference biometric datasets are downloaded from the remote server, the invention applies equally to a first biometric dataset being downloaded and a second biometric dataset being acquired from the first or the second individual; and although above the reference biometric datasets are deleted at the end of operations for collecting biometric material, the invention applies equally to a method in which the reference biometric datasets are conserved at the end of the collection operations.

The invention claimed is:

1. A method of collecting biological material with the help of a mobile terminal, said mobile terminal comprising an electronic processor unit (2) connected to an image capture device and to an alerting member (4) in order to control them, the capture device having optical characteristics adapted to acquiring images of dermatoglyphs (60.1);

the method comprising the following steps:

acquiring a first image of a first dermatoglyph and extracting a first candidate biometric dataset therefrom;

comparing the candidate biometric dataset with reference biometric datasets and determining a similarity score between the candidate biometric dataset and each of the reference biometric datasets;

comparing the similarity scores with a first predetermined threshold;

when none of the similarity scores is greater than the first predetermined threshold, issuing a first alert; and when the first alert is issued, proceeding to collect biological material in a zone neighboring the first dermatoglyph.

2. The method according to claim 1, including an additional step, when the first alert is issued, of preparing a first identifier and of storing the first identifier in association with the first image.

3. The method according to claim 2, wherein the first identifier comprises a barcode.

4. The method according claim 1, including an additional step of issuing a second alert once there exists a similarity score that is greater than a second predetermined threshold.

5. The method according to claim 1, including a preliminary step of using the image capture device to acquire the reference biometric datasets.

6. The method according to claim 1, wherein the reference biometric datasets are stored, at least in part, on a remote server, and the mobile terminal includes communication means for communicating with the remote server.

7. The method according to claim 1, including a step of deleting the reference biometric datasets at the end of operations for collecting biological material.

8. A mobile terminal comprising an electronic processor unit connected to an image capture device and to an alerting member in order to control them, the image capture device having optical characteristics adapted to acquiring images of dermatoglyphs; and wherein the processor unit is programmed to perform the method according to claim 1.

9. The mobile terminal according to claim 8, wherein the alerting member produces an audible and/or a visible warning and/or comprises a buzzer.

10. The mobile terminal according to claim 8, wherein the image capture device comprises an optical sensor.

* * * * *